United States Patent
Liberatore

(10) Patent No.: US 9,066,528 B2
(45) Date of Patent: Jun. 30, 2015

(54) CONFECTIONARY CORE COATING METHOD

(75) Inventor: Mauro Liberatore, Rome (IT)

(73) Assignee: SOREMARTEC S.A., Findel (LU)

( * ) Notice: Subject to any disclaimer, the term of this patent is extended or adjusted under 35 U.S.C. 154(b) by 0 days.

(21) Appl. No.: 13/702,431

(22) PCT Filed: Jun. 10, 2011

(86) PCT No.: PCT/IB2011/001304
§ 371 (c)(1),
(2), (4) Date: Feb. 13, 2013

(87) PCT Pub. No.: WO2011/154821
PCT Pub. Date: Dec. 15, 2011

(65) Prior Publication Data
US 2013/0142924 A1 Jun. 6, 2013

(30) Foreign Application Priority Data

Jun. 10, 2010 (IT) .............................. TO2010A0492

(51) Int. Cl.
*A23G 3/00* (2006.01)
*A23G 3/34* (2006.01)

(52) U.S. Cl.
CPC .............. *A23G 3/0095* (2013.01); *A23G 3/34* (2013.01)

(58) Field of Classification Search
CPC .............................. A23G 3/0095; A23G 3/34
USPC ........... 426/89, 302, 303, 304, 305, 306, 307, 426/308, 309, 310, 242, 289, 299, 290, 291, 426/273, 297; 427/544, 551, 553, 595, 240
See application file for complete search history.

(56) References Cited

U.S. PATENT DOCUMENTS

| | | | | |
|---|---|---|---|---|
| 3,554,767 A | * | 1/1971 | Daum | 426/6 |
| 3,635,735 A | * | 1/1972 | Patil | 426/3 |
| 3,719,497 A | * | 3/1973 | Galle et al. | 426/250 |
| 4,418,083 A | * | 11/1983 | McKinney et al. | 426/242 |
| 4,859,493 A | * | 8/1989 | Lemelson | 427/562 |
| 5,962,057 A | * | 10/1999 | Durance et al. | 426/465 |
| 2004/0105919 A1 | | 6/2004 | Chisholm | |
| 2006/0198924 A1 | | 9/2006 | Song et al. | |
| 2009/0220676 A1 | | 9/2009 | Koerblein | |

FOREIGN PATENT DOCUMENTS

WO 96/39866 A1 12/1996
WO 03/047361 A1 6/2003

OTHER PUBLICATIONS

Glatt, et al., "A new sugar coating process", Review for Chocolate, Confectionery and Bakery, vol. 4, No. 1, Jan. 1, 1979 p. 31, XP009142875.

* cited by examiner

*Primary Examiner* — Jyoti Chawla
(74) *Attorney, Agent, or Firm* — Rothwell, Figg, Ernst & Manbeck, P.C.

(57) ABSTRACT

A method and machine for coating confectionary product cores, whereby a mass of cores for coating is loaded into a chamber of a rotary drum and coated to form a shell on each core; forming the shell including at least one step of spraying the cores with sweet syrup, followed by at least one step of drying the syrup sprayed onto the cores; the drying step being performed by reducing the pressure in the chamber to less than −0.2 bar, and heating the sprayed cores to a maximum of 35° C. using electromagnetic radiation, preferably microwaves.

8 Claims, 3 Drawing Sheets

CONFECTIONARY CORE COATING METHOD

CROSS REFERENCE TO RELATED APPLICATION(S)

This application is a 35 U.S.C. §371 National Phase Entry Application from PCT/IB2011/001304, filed Jun. 10, 2011, designating the United States and claiming priority to Italian Application TO2010A000492 filed Jun. 10, 2010, the above identified applications are incorporated by reference herein in their entirety.

TECHNICAL FIELD

The present invention relates to a method of continuously coating confectionary cores, to which the following description refers purely by way of example.

BACKGROUND ART

In the confectionary industry, products are manufactured comprising a core, and an outer coating or shell covering the core.

More specifically, candies are manufactured comprising a core, preferably formed by compacting powdered substances containing sugar, flavourings and excipients; and a hard, compact, sweet outer shell varying in thickness according to the type of product.

The shell is formed in machines comprising a rotating drum, in which the cores for coating are tumbled continuously and alternately sprayed periodically with sweet syrup and flavourings. After each syrup spraying, the cores are dried by blowing hot air through the drum to remove moisture from the syrup and leave a film on the cores. The number of spray and dry cycles depends on the desired coating or shell thickness, which is considerable, especially in candies in which the shell weighs almost as much as the core. In which case, the coating process is a long, time-consuming job, which limits the extent to which output can be increased.

Moreover, the known coating method makes it extremely difficult to maintain the organoleptic quality of the sprayed products and particularly the flavourings. That is, the products are both sprayed and dried in a high-temperature, oxygen-containing environment, normally of over 60° C., which inevitably initiates degradation of the flavourings; and reducing the temperature by reducing the temperature of the drying air only further increases cycle time.

DISCLOSURE OF INVENTION

It is an object of the present invention to provide a confectionary core coating method designed to provide a straightforward, low-cost solution to the above problems.

Another object of the present invention is to eliminate the above drawbacks with as few alterations as possible to existing equipment and machinery.

According to the present invention, there is provided a method of coating confectionary cores in a coating machine comprising a hollow drum rotating about its axis of rotation and defining at least one chamber for housing a mass of cores for coating; the method comprising the steps of loading the mass of cores for coating into said chamber, and forming at least one coating on each core; forming said coating comprising the steps of spraying said cores with at least one coating product comprising at least one liquid component, and drying at least part of said coating product; and the method being characterized in that the drying step comprises a step of depressurizing said chamber to a pressure of at least −0.2 bar with respect to atmospheric pressure; and a step of heating at least said coating product deposited on said cores to a temperature of less than 35° C.

In the method defined above, the temperature preferably ranges between 20° C. and 35° C., and said chamber is conveniently depressurized to a pressure ranging between −0.7 and −0.9 bar with respect to atmospheric pressure.

BRIEF DESCRIPTION OF THE DRAWINGS

A non-limiting embodiment of the present invention will be described by way of example with reference to the attached drawings, in which.

BEST MODE FOR CARRYING OUT THE INVENTION

Figure 1:
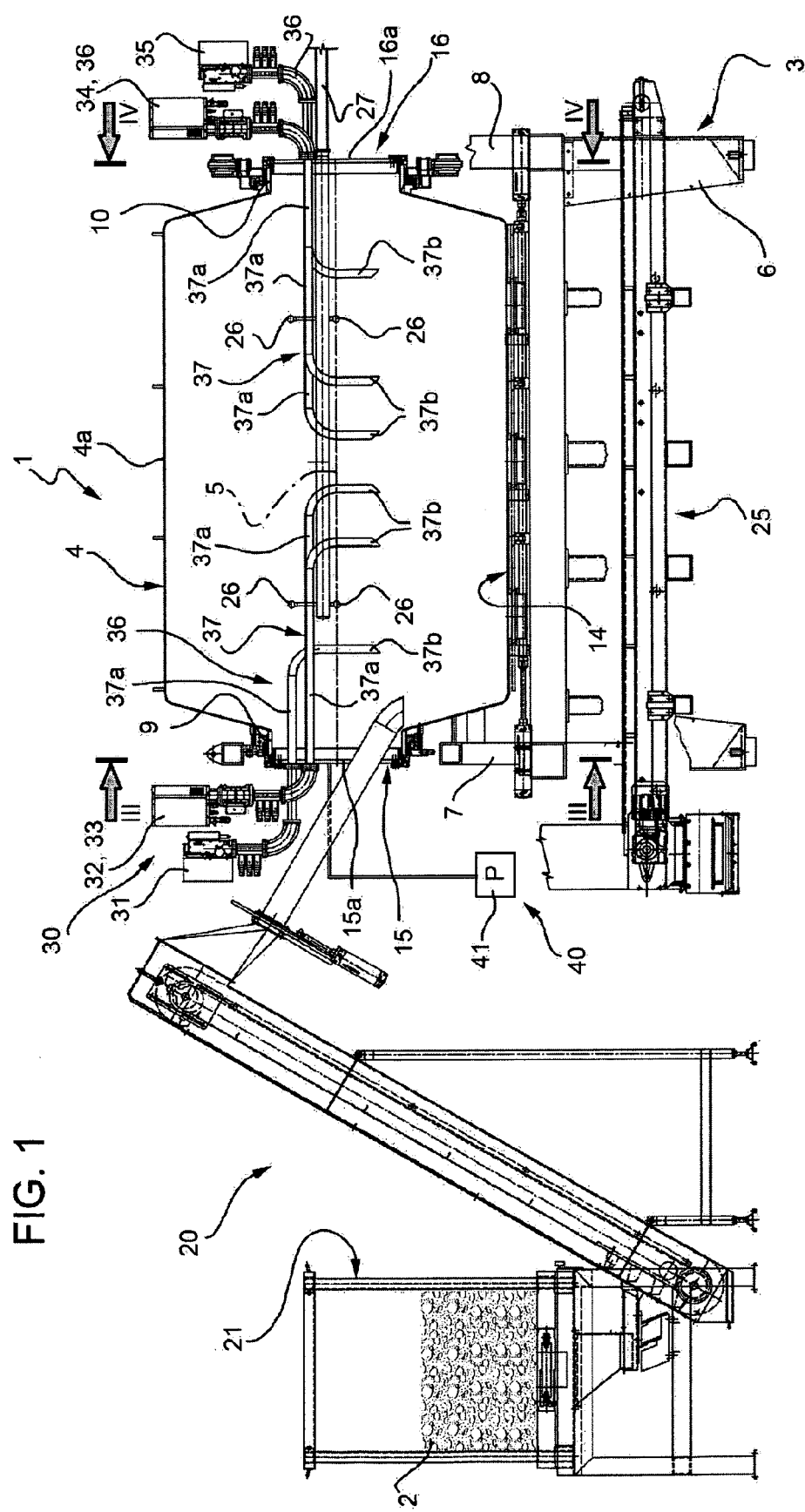
FIG. 1 shows a schematic side view of a preferred embodiment of a product core coating machine in accordance with the present invention.
Figure 2:
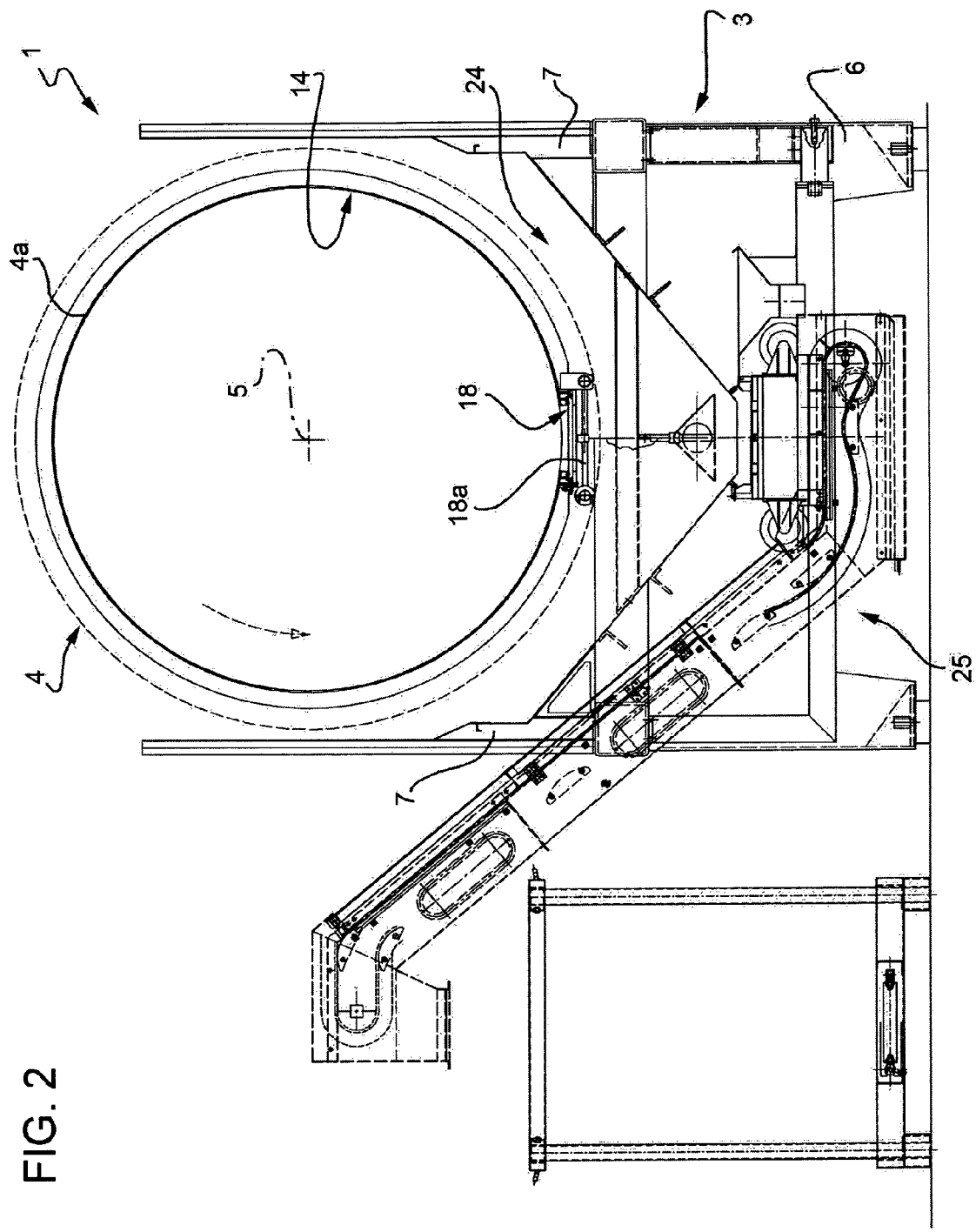
FIG. 2 shows a front view of the FIG. 1 machine.

Number 1 in FIGS. 1 and 2 indicates as a whole a machine for coating cores 2, in particular of confectionary products such as mints, Tic-Tacs, etc.

Machine 1 comprises a supporting structure 3, and, over it, a hollow drum 4 with a substantially horizontal axis 5. Supporting structure 3 comprises a fixed base 6; and two pairs 7 and 8 of uprights, which extend upwards from base 6, at opposite axial ends of drum 4, and are each fitted with a respective axial end collar 9, 10 of drum 4, hinged to rotate about axis 5.

Figure 3:
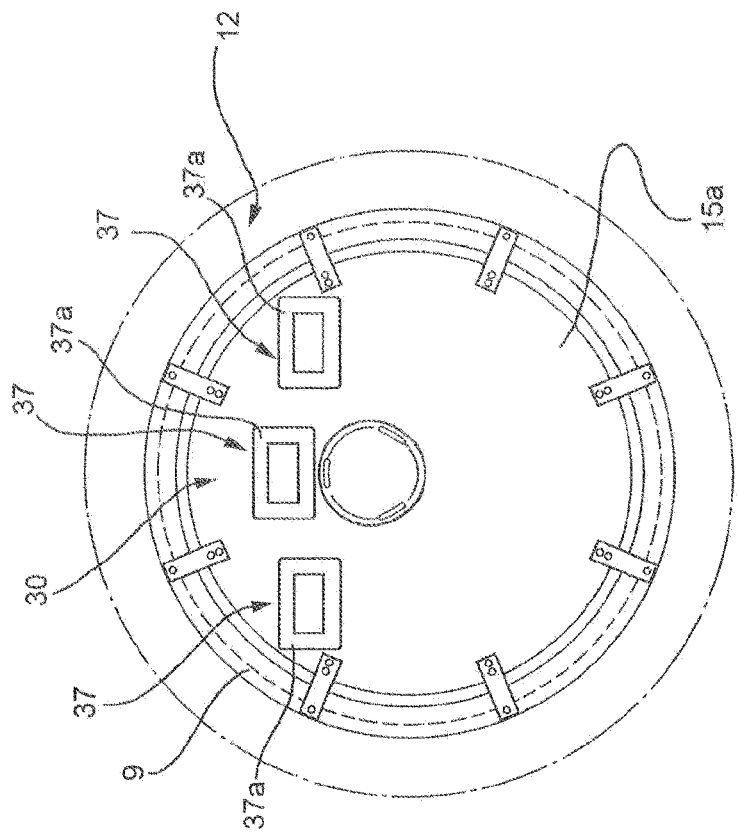
FIGS. 3 and 4 show larger-scale sections, with parts removed for clarity, along respective lines III-III and IV-IV in FIG. 1.
Figure 4:
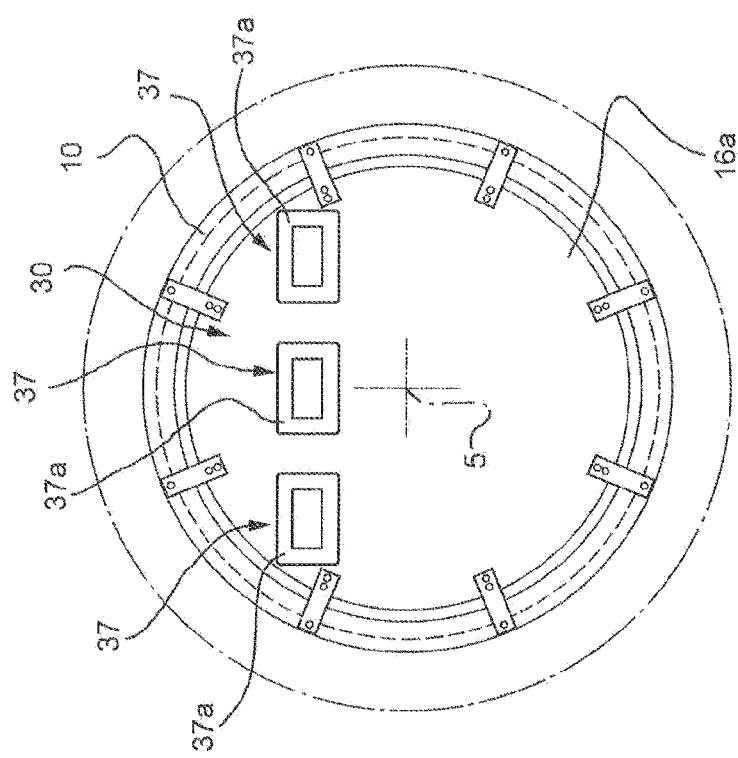

Drum 4 is rotated about axis 5 by a known motor reducer assembly 12 (not described in detail) connected to collar 9 (FIG. 3), and defines a chamber 14, which communicates with the outside through two axial openings 15, 16 (FIGS. 1 and 2) defined by respective collars 9, 10 and closed in substantially fluidtight manner by respective hatches 15a, 16a. Chamber 14 also communicates with the outside through a lateral opening 18 (FIG. 2) formed through the lateral wall 4a of drum 4 and closed in fluidtight manner by a hatch 18a.

Hatch 15a is designed to permit insertion of an end portion of a loading conveyor 20—conveniently a known belt conveyor not described in detail—for transferring a mass of cores 2 from a container 21 to chamber 14.

With reference to FIG. 2, machine 1 comprises a hopper 24 located beneath drum 4 to receive the coated cores discharged from opening 18, and feed them onto a known unloading belt conveyor 25 not described in detail.

With reference to FIG. 1, machine 1 also comprises a number of spray nozzles 26 (only a few of which are shown) spaced along axis 5 and connected to an external feed circuit 27 for feeding chamber 14 with a coating material for coating cores 2. The coating material comprises at least one liquid component, normally sweet syrup; and flavourings selected according to the type of cores and/or the shell required.

As shown in FIG. 1, machine 1 also comprises an electromagnetic radiation, conveniently microwave, drying assembly 30, in turn comprising three independent electromagnetic noncoherent microwave generating devices 31, 32, 33, of equal or different potentials, fitted to structure 3, next to collar 9; and a further three generating devices 34, 35, 36 identical to devices 31, 32, 33 and fitted to structure 3, next to collar 10.

Each device 31-36 comprises a waveguide 37 extending through relative hatch 15a, 16a, and having a straight axial portion 37a parallel to axis 5, and a radial end portion 37b for directing radiation onto cores 2 at the bottom of chamber 14. The lengths of straight portions 37a and radial portions 37b are selected to evenly heat the bed of cores 2. With reference to FIG. 1, machine 1 also comprises a known depressurizing device 40 (shown schematically) for depressurizing chamber 14, and which conveniently comprises a suction pump 41 for extracting air from chamber 14 and forming in chamber 14 a low pressure of no more than −0.2 bar, and conveniently ranging between −0.7 and −0.9 bar, with respect to atmospheric pressure.

With reference to FIG. 1, machine 1 also comprises a known depressurizing device 40 (shown schematically) for depressurizing chamber 14, and which conveniently comprises a suction pump 41 for extracting air from chamber 14 and forming in chamber 14 a low pressure of at least −0.2 bar, and conveniently ranging between −0.7 and −0.9 bar, with respect to atmospheric pressure.

The way in which cores 2 are coated, i.e. in which the coating or shell of cores 2 is formed, will now be described as of the condition in which a mass of cores 2 for coating is loaded inside chamber 14, hatches 15a, 16a, 18a are closed, and drum 4 is rotated about axis 5 by motor reducer assembly 12.

As of the above condition, depressurizing device 40 extracts air from chamber 14 to depressurize it to a threshold pressure of no more than −0.2 bar with respect to atmospheric pressure.

Before the above low pressure, or after the threshold pressure, is reached, a predetermined amount of sweet syrup is fed into drum 4 by external circuit 27 and sprayed onto the bed of cores 2 by nozzles 26. As drum 4 rotates and tumbles cores 2, the syrup is sprayed onto and deposited evenly on the outer surface of cores 2. Once spraying is completed, or after a given hold interval, with the drum still rotating, to soak all the pastilles with the sprayed sugar substance, the cores are dried by activating electromagnetic drying devices 31-36, which gradually heat the syrup-sprayed cores to a temperature of no more than 35° C. Drying time varies according to the potential of electromagnetic devices 31-36, the type of sweet syrup used, and the low pressure inside chamber 14. In the pressure and temperature conditions described, drying takes from 1 second to 10 minutes. By continually rotating drum 4, cores 2 are dried evenly, and a coating gradually formed on each core.

The above coating process is repeated as many times as necessary to achieve the desired coating thickness.

A given flavouring is sprayed on between at least two consecutive spray steps.

Compared with known methods, the coating method described therefore provides, on the one hand, for fast coating cores 2, and, on the other, for producing products of better organoleptic quality.

This is mainly due to coating being performed in a chamber maintained at a low pressure below the −0.2 bar threshold, and in which cores 2 and the sprayed products are never subjected to a temperature higher than 30° C. Tests show that increasing the low pressure in chamber further improves the quality of certain types of coated products, such as mints, Tic-Tacs, etc., and that excellent results are achieved with low pressures ranging between −0.7 and −0.9 bar, with respect to atmospheric pressure, and corresponding to temperatures ranging between 35° C. and 20° C.

In other words, significantly depressurizing chamber 14 and operating at temperatures of less than half current coating temperatures provides for operating with substantially no oxygen in chamber 14, which, combined with the low temperature, substantially preserves the organoleptic quality of the flavourings, and in general all the components of the products sprayed onto the cores, thus safeguarding them from any form of degradation throughout the coating process.

Operating in a very low-pressure chamber 14 also assists infeed of the syrup and flavourings into drum 4, thus distributing them more evenly over cores 2 and so improving the dimensional quality and look of the finished products.

Finally the core coating method described can be implemented on machines which differ from conventional machines by comprising substantially sealed core processing chambers, depressurizing devices for depressurizing the chambers to the pressure indicated, and appropriate electromagnetic devices for vacuum heating and drying the cores.

Clearly, changes may be made to the method and machine 1 as described herein without, however, departing from the protective scope defined in the independent Claims. The cores, in fact, may obviously be coated in machines differing entirely in design from the one described by way of example, but still featuring core processing chambers maintained at very low pressure. Tests, in fact, show that low pressures only slightly below atmospheric pressure, for example, do not permit operation in substantially oxygen-free conditions, to prevent oxidation of the flavourings, or a drastic reduction in the temperature to which the sprayed cores are subjected.

The cores may obviously also be dried using electromagnetic devices other than the microwave devices described, and in particular using any device capable of operating in high-vacuum conditions, in which conventional systems for heating the wall of drum 4 cannot be used for obvious reasons of heat transmission.

The invention claimed is:

1. A method of coating confectionary cores in a coating machine comprising a hollow drum rotating about its axis of rotation and defining at least one chamber for housing a mass of cores for coating; the method comprising the steps of loading the mass of cores for coating into said chamber, and forming at least one coating on each core; forming said coating comprising the steps of twice spraying said cores with at least one coating product comprising at least one liquid component, spraying said cores with a flavoring between the sprayings with the at least one coating product, and drying at least part of said coating product; and the method being characterized in that the drying step comprises a step of depressurizing said chamber to a pressure of no more than −0.2 bar with respect to atmospheric pressure; and a step of heating at least said coating product deposited on said cores to a temperature of less than 35° C., wherein the step of spraying said cores with the flavoring is performed after the first spraying of the at least one coating product is dried.

2. The method as claimed in claim 1, wherein said temperature ranges between 20° C. and 35° C.

3. The method as claimed in claim 2, wherein said chamber is depressurized to a pressure ranging between −0.7 and −0.9 bar with respect to atmospheric pressure.

4. The method as claimed in claim 1, wherein the heating step lasts from 1 second to 10 minutes.

5. The method as claimed in claim 1, wherein the heating step is performed by inserting at least one electromagnetic heat source inside said hollow drum.

6. The method as claimed in claim 5, wherein said electromagnetic heat source is a microwave heat source.

7. The method as claimed in claim 1, wherein said temperature range is between 20° C. and 29.9° C.

8. The method as claimed in claim 1, wherein the heating step lasts for 1 second to 59 seconds.

\* \* \* \* \*